(12) United States Patent
Berkowitz et al.

(10) Patent No.: US 6,259,905 B1
(45) Date of Patent: Jul. 10, 2001

(54) METHOD AND APPARATUS TO MINIMIZE DIALING AND CONNECTING DELAYS IN A WIRELESS LOCAL LOOP SYSTEM

(75) Inventors: Paul Berkowitz, Little Silver, NJ (US); William Huang, Alameda, CA (US); Takeshi Nishiyama; Tadashi Ohmori, both of Machida (JP)

(73) Assignee: UTStarcom, Inc., Iselin, NJ (US)

( * ) Notice: Subject to any disclaimer, the term of this patent is extended or adjusted under 35 U.S.C. 154(b) by 0 days.

(21) Appl. No.: 09/225,756

(22) Filed: Jan. 5, 1999

Related U.S. Application Data
(60) Provisional application No. 60/070,738, filed on Jan. 8, 1997.

(51) Int. Cl.[7] .................................................. H04M 9/00
(52) U.S. Cl. ............................................ 455/401; 455/445
(58) Field of Search ..................................... 455/445, 401, 455/422, 426, 554, 555; 379/200, 352, 718, 399

(56) References Cited

U.S. PATENT DOCUMENTS

| 5,475,735 | * | 12/1995 | Williams et al. ..................... 379/59 |
| 5,933,786 | * | 8/1999 | Sarpola et al. ........................ 455/560 |
| 5,983,117 | * | 11/1999 | Sandler et al. ....................... 455/557 |
| 6,002,919 | * | 12/1999 | Posti ................................... 455/67.1 |
| 6,052,575 | * | 4/2000 | Lahdemaki et al. . |

* cited by examiner

*Primary Examiner*—Nguyen T. Vo
*Assistant Examiner*—N. Mehrpour
(74) *Attorney, Agent, or Firm*—Wilson Sonsini Goodrich & Rosati (57) ABSTRACT

A method of sending local dial tone to the subscriber from the fixed subscriber unit (FSU) is described. The method can include receiving and memorizing DTMF dialing from a connected telephone. Outpulse this DTMF dial signal information from the FSU to the network. After establishing the wireless communication between the FSU and a wireless base station, providing a cut-through of the audio path between the network and the subscriber.

26 Claims, 9 Drawing Sheets

METHOD AND APPARATUS TO MINIMIZE DIALING AND CONNECTING DELAYS IN A WIRELESS LOCAL LOOP SYSTEM

RELATED APPLICATIONS

This applications relates to, incorporates by reference, and claims priority from U.S. patent application Ser. No. 60/070,738, filed Jan. 8, 1997, entitled "Method to Minimize Dialing and Connecting Delays in a Wireless Local Loop System Employing Fixed Subscriber Units," having inventors Paul Berkowitz, William Huang, Takeshi Nishiyama and Tadashi Ohmori.

BACKGROUND OF THE INVENTION

1. Field of the Invention

This invention relates to the field of communications. In particular, the invention relates to minimizing dialing and correcting delays in wireless local loop systems and other systems that are prone to such delays.

2. Description of the Related Art

The commercial importance of Wireless Local Loop Systems ("WLL") using Fixed Subscriber Units ("FSU") is increasing all over the world. A WLL System is designed to connect a subscriber to the telephone network using wireless methods. These systems may use an FSU to connect a conventional telephone to the network using wireless means. A design goal for these systems is to minimize the delay between the time that a subscriber goes off-hook to originate a call and the time that dial tone is provided to the subscriber indicating that it is time to dial.

The delay is caused by the time required to establish a wireless communications channel for a telephone. It is undesirable to have a wireless communications channel be maintained all of the time because this does not use the wireless communications bandwidth efficiently.

Other communications systems include these types of delay. For example, voice over IP technology may encounter long delays before a dial tone is received at the telephone.

Therefore, it is desirable to have a communications system with a reduced dialing and connection delay.

SUMMARY OF THE INVENTION

Various embodiments of the invention include a method of sending local dial tone to the subscriber from the fixed subscriber unit (FSU). The method can include receiving and memorizing DTMF dialing from a connected telephone. Outpulse this DTMF dial signal information from the FSU to the network. After establishing the wireless communication between the FSU and a wireless base station, providing a cut-through of the audio path between the network and the subscriber.

Some embodiments of the invention support feature transparency issues regarding unintentional off-hook states, private line automatic ring-down operation, FLASH, re-answer and disconnect.

Other embodiments of the invention support local dial tone in any system that would otherwise provide delayed dial tone to a subscriber. For example, one embodiment of the invention provides dial tone for voice over IP systems.

DETAILED DESCRIPTION

System Overview

Figure 1:
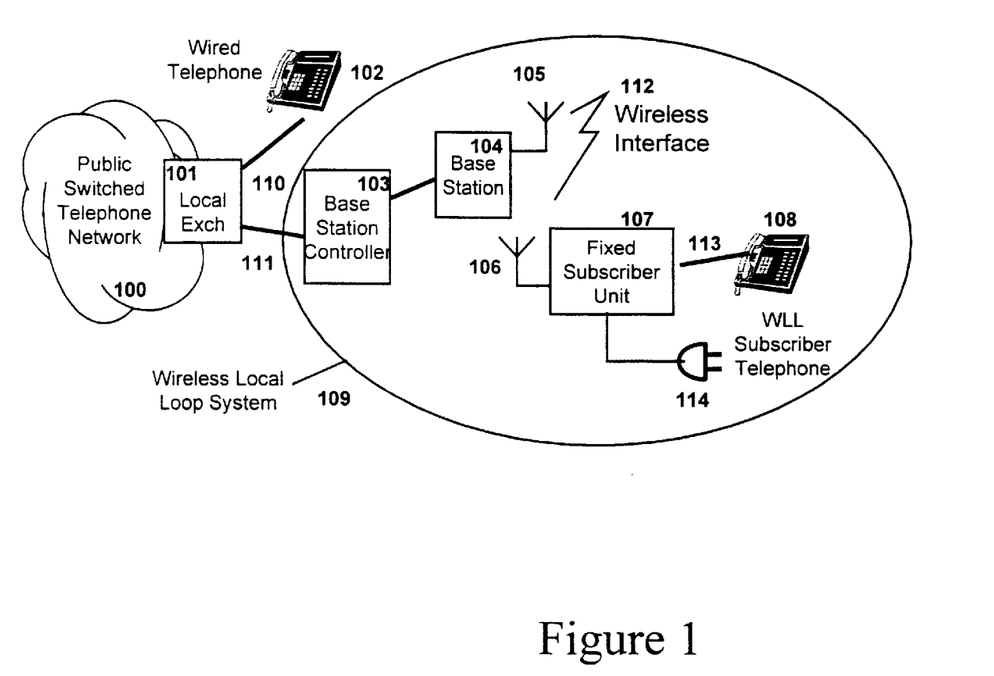
FIG. 1 illustrates a Wireless Local Loop (WLL) system that can be used in one embodiment of the invention.

A WLL system 109 is shown in FIG. 1. This WLL system 109 can be used to implement one embodiment of the system where minimized dialing and connection delays are achieved. The WLL system 109 is also used to illustrate some problems with previous systems. Prior to describing the problems and solutions, the elements of the system 109 are described.

Telephone service is delivered through the Public Switched Telephone Network ("PSTN") 100, which is generally responsible for supervising subscriber telephone equipment, and routing and transmitting subscriber call traffic between multiple subscribers. The edge vehicle for the PSTN 100 is the Local Exchange switch ("LE") 101. For incoming calls the LE 101 routes calls to the subscribers it locally serves, provides alerting (ringing) signaling to the called local subscriber, detects off-hook answer by the called subscriber, provides a transmission path between the rest of the PSTN 100 and the called subscriber, and provides call completion indication through the PSTN 100 to the calling party's LE 101 to establish billing records. For outgoing calls, the LE 101 detects subscriber off-hook state indicating call origination, provides dial tone, accepts and analyzes calling party dialing signals, routes calls, detects far-end called party answer, provides a transmission path between calling party and the rest of the PSTN 100, and generates billing records. In general, the LE 101 is also responsible for providing any other locally important supplementary calling features like Hold, Conference, Transfer, Call Waiting Indication, and so on. Importantly, the PSTN 100 and the LE 101 are representative of telecommunications systems that provide dial tone and communications connections.

In the following, it should be understood that all references to a single subscriber telephone are intended to refer to one or more of the multitude of subscriber phones in the WLL system 109.

A wired telephone 102 may be connected directly to the LE 101 using a metallic local loop 110 or, alternatively, through the WLL system 109.

The WLL subscriber telephone 108 may be a conventional standard telephone (e.g. having similar functionality to the wired telephone 102). The WLL subscriber telephone 108 couples to the FSU 107 through a metallic local loop 113, similar in its electrical characteristics to metallic loop 110. The FSU 107 acts as a converter between the wireless interface 112 and the metallic interface 113. The FSU 107 is locally powered through plug 114.

The FSU 107 uses a radio antenna 106 to couple to a wireless interface 112. The wireless interface 112 may be any of a great variety of wireless interface protocols such as Personal Handy-phone Service ("PHS"), Digital European Cordless Telephone ("DECT"), Personal Advanced Communications System ("PACS"), Groupe Special Mobile ("GSM"), Advanced Mobile Phone System ("AMPS"), Code Division Multiple Access ("CDMA") or other standardized or proprietary wireless communications interfaces.

The wireless interface 112 leads to an antenna 105 associated with a base station 104 which supports a similar and compatible wireless interface protocol to the FSU 107. The base station 104 ("BS") couples to the base station controller ("BSC") 103 which in turn couples to the LE 101 over the local exchange interface to an access network 111 which may be one or more metallic loops similar to metallic loop 110 or may be one or more digital multiplexed interfaces (e.g. as Mercury T1067, Bellcore GR-303 or ITU V5.1 or V5.2. or may be a proprietary interface).

An important aspect of some embodiments of the invention is that the WLL system 109 provides equivalent service to the subscriber telephone 108 as that provided to the wired telephone 102 such that the users of the telephone 102 and the telephone 108 perceive minimal differences in operational characteristics.

Delay Scenarios

Prior to describing the detailed functioning of various embodiments of the invention, various scenarios are described which show the cause of the dial tone and connection delays.

A new call origination from the telephone 108 begins when the telephone 108 transitions from on-hook idle state to off-hook active state. The subscriber at the telephone 108 waits for dial tone before dialing. There are two possibilities to consider:

Case A: Dial Tone is provided be LE 101

The FSU 107 detects the off-hook state of the telephone 108 and makes a request to the BSC 103 through the wireless interface 112 to establish a continuous transmission path between the local exchange and telephone 108. This continuous path has two segments:

Segment 1: The wireless interface 112 between the FSU 107 and the BS 105

Because wireless interface traffic channels are a shared and scarce resource, they are typically allocated dynamically on a call-by-call basis. The negotiation between the FSU 107 and the BSC 103 to allocate a traffic channel may take several seconds using available wireless interface protocols.

Segment 2: The LE-BSC 111 between the LE 101 and the BSC 103.

The BSC 103 makes a request to the LE 101 for a new call origination and then establishes the transmission path over this segment in a short period of time.

In this scenario, the delay associated with Segment 1 above may be perceptible as "dial tone delay" and annoying to the user. This delay violates the goal of providing WLL service characteristics that are equivalent to the service characteristics of a wired telephone. Since the delay in Segment 1 may be difficult to reduce, an alternate method is needed.

After this delay a complete transmission path is now established and the subscriber hears dial tone emanating from the LE 101 and may dial. If the dialing is in the form of Dual Tone Multi-Frequency ("DTMF") tones, as is commonly the case, the DTMF tones are transmitted through the newly available transmission path between the FSU 107 and the LE 101. The LE 101 is able to receive and interpret the dialed digits and provide appropriate call progress tones or other responses. For example, if the dialed number is seven digits long, the LE 101 will typically remain silent for the duration of dialing and then provide either busy or ring-back tone on completion of dialing. If an unexpected long pause, or incorrect dial sequence occurs during the dialing process, the LE 101 may indicate with fast busy, a recorded announcement, howler tone, a $2^{nd}$ dial tone or other such treatment. The use of these tones and treatments is to provide rapid and understandable feedback to the dialing subscriber and to promote rapid entry into the call-completed state if the dialing was successful or rapid corrective action such as re-try if the dialing was unsuccessful.

Case B: Dial Tone is Provided by the FSU 107

The FSU 107 detects off-hook state of the telephone 108 and makes a request to the BSC 103 through the wireless interface 112 to establish a continuous transmission path between the LE 101 and the telephone 108. This continuous path has two segments:

Segment 1: The wireless interface 112 between FSU 107 and BS 105

As noted above, because the wireless interface traffic channels are a shared and scarce resource, they are typically allocated dynamically on a call-by-call basis. The negotiation between the FSU 107 and the BSC 103 to allocate a traffic channel may take several seconds using available wireless interface protocols.

Segment 2 The LE-BSC interface 111 between the LE 101 and the BSC 103.

The BSC 103 makes a request to the LE 101 for a new call origination and then establishes the transmission path over this segment in a short period of time.

In this case, however, upon detecting off-hook, immediately and in parallel, the FSU 107 provides local dial tone to the subscriber at the telephone 108. The subscriber at the telephone 108, upon hearing dial tone may proceed to dial. The dialed digits however can not be transmitted to the LE 101 at this time because the wireless interface traffic channel in Segment 1 above has not yet been established. The FSU 107 must detect and store the dialed DTMF digits with the purpose of sending all of the collected digits as a group at a later time. During this digit collection interval, the FSU 107 must block (prevent) transmission between the telephone 108 and the wireless interface 112 so that any DTMF digits that happen to be dialed after the Segment 1 traffic channel and Segment 2 LE-BSC Interface 111 are established do not leak through. At the end of the dialing sequence, all of the stored digits can be outpulsed from the FSU 107 to the LE 101 and the transmission path in the FSU 107 between the telephone 108 and the wireless interface 112 may then be established.

The great benefit of the Case B approach when compared to Case A above is that dial tone is provided to the subscriber immediately upon going off-hook without the delays caused by traffic channel establishment. However, the need to determine that the dialing sequence is over and that it is time to outpulse all stored digits and establish the transmission path creates anew source of delay: "post dial cut-through delay". It can be difficult for the FSU 107 to maintain enough intelligence to analyze the stored digits, compare them to rules governing dial string formation and determine that sufficient digits have been received to declare that end-of-dialing has occurred. So the FSU 107 must determine the end-of-dialing by using an inter-digital timer and timeout threshold. The rule might be that when the interval following a dialed digit with no newly arriving digits exceeds a certain value, end-of-dialing is declared and all stored digits are outpulsed.

If this interval is made too short, then the subscriber is likely to suffer when an inadvertent pause results in a premature outpulsing operation at the same time that the subscriber dials a subsequent digit. This new digit would not be transmitted and truncation of the dial string would result. If this interval is too long then the subscriber must wait an excessive amount of time following the last dialed digit before the call is cut-through. The subscriber meanwhile receives no call progress feedback from the LE 101 during the dialing operation since none of the dialed digits reach the LE 101 until the final outpulsing operation takes place. So the subscriber perceives a long and annoying silent period following dialing FSU Functional Description In some embodiments of the invention, concerning FSU design, a hybrid between Case A and Case B is used to achieve low dial tone delay AND low post-dial cut-through delay.

Figure 2:
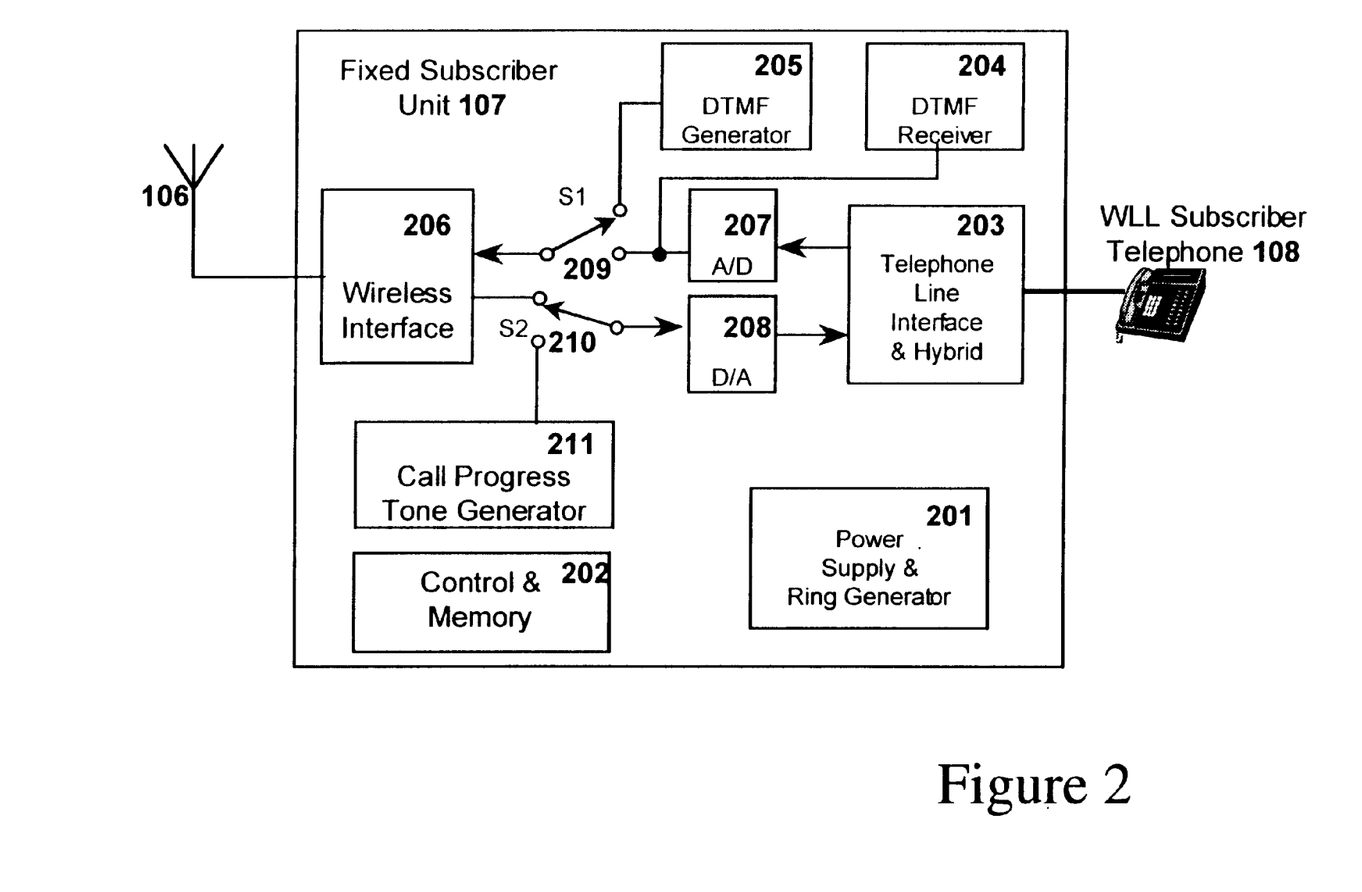
FIG. 2 illustrates a fixed subscriber unit (FSU) that may be used in one embodiment of the invention.

A functional block diagram showing the structure of the FSU 107 is shown in FIG. 2. The FSU 107 includes software and/or hardware to help eliminate the problems of delayed dial tone for the end user. The system of FIG. 2 includes additional elements such as the WLL subscriber telephone 108 and the radio antenna 106.

The FSU 107 includes a number of blocks. The power supply and ringing generator 201 supplies internal logic voltages, telephone line talk and supervision battery, and ringing voltage.

The telephone line interface and hybrid 203 is responsible for power feeding to the WLL subscriber telephone 108, switch-hook supervision, application of ringing voltage and separation by hybrid of the incoming (transmit) and outgoing (receive) audio pathways.

The A/D converter 207 converts the analog transmit audio signal into digital format. The D/A converter 208 converts the receive audio signal from digital format to analog.

The DTMF receiver 204 detects dialed digits in digital format and the DTMF generator 205 generates DTMF digits in digital format.

The call progress tone generator 211 generates any of a number of tones including dial tone, ring-back and others in digital format towards the subscriber receive path.

The wireless interface 206 takes care of all layers of the air interface protocol for establishing audio traffic and control traffic connectivity through the air.

The switch S1 209 determines whether the wireless interface 206 receives subscriber audio signals or internally generated DTMF digits. The switch S2 210 determines whether the subscriber telephone receives internally generated dial tone or the audio traffic signal received by the wireless interface 206. S1 and S2 can be software controlled.

The control and memory 202 uses a stored program microprocessor and is responsible for overall system logic and real-time control. It has input/output couplings to all the other blocks for the purpose of orchestrating all FSU functions. Its memory is used to store the programmed logic of the FSU 107, temporary operational variables and any temporarily stored digits received from the subscriber telephone 108.

Other embodiments of the invention can use other blocks in the FSU 107 or the blocks can be distributed into some of the other components in the system. For example, the A/D and D/A blocks could be supplemented by packet-mode communications where the subscriber telephone system includes packet assembler/disassembler blocks and supports packetized voice communications, such as in Voice Over Internet Protocol ("VOIP") systems.

New Call Origination without Dial Tone Delay

Figure 3:
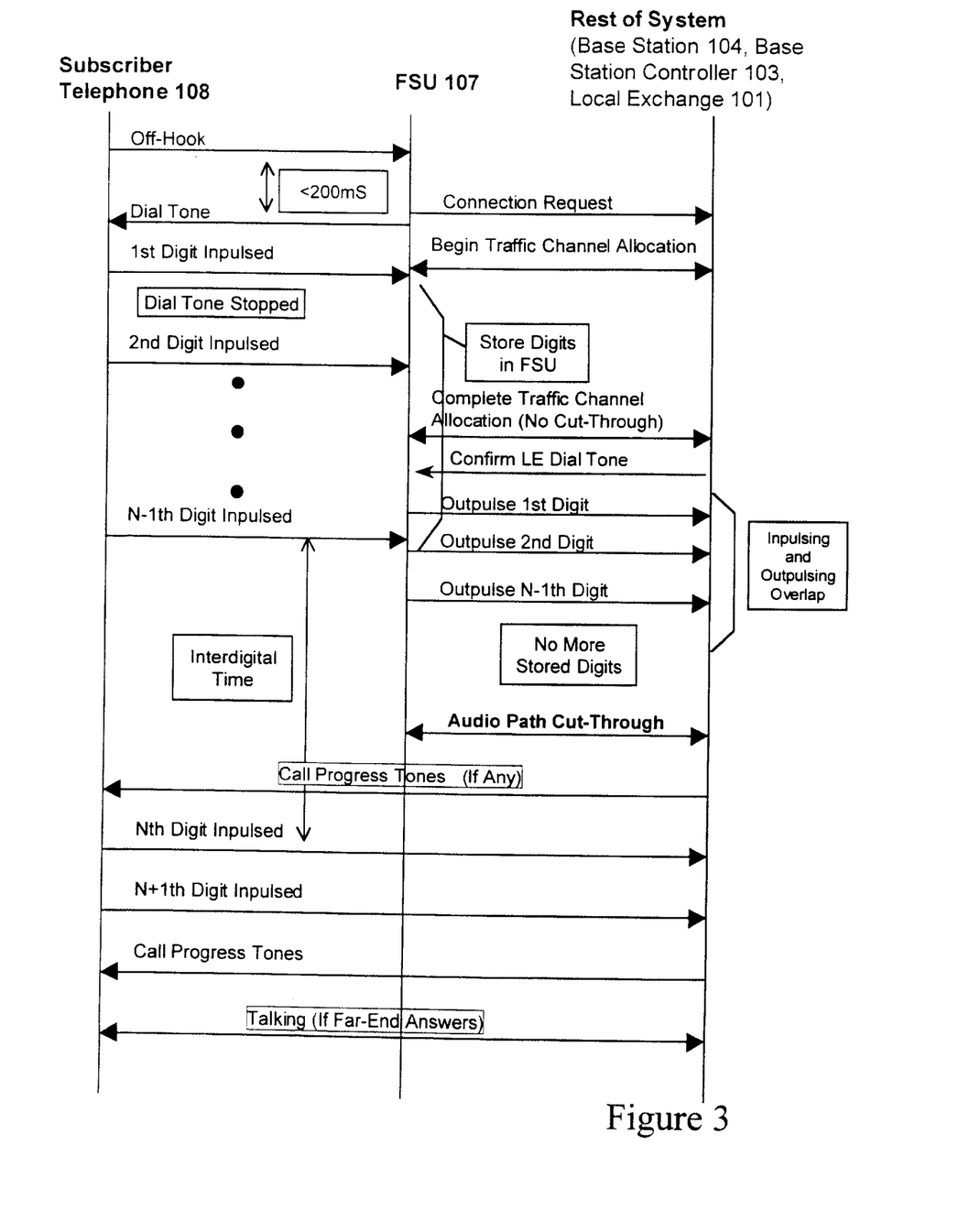
FIG. 3 illustrates a message and event flow for a new call origination using the system of FIG. 1.

FIG. 3 shows message and event flow for a new call origination using the system of FIG. 1 where the FSU 107 includes the blocks in FIG. 2. Messages and signals flow between three logical entities: the subscriber telephone 108, represented by the left-most vertical line; the FSU 107, represented by the middle vertical line; and the rest of the system (represented by the BS 104, the BSC 103 and the LE 101), represented by the right-most vertical line. For simplicity the BS 104, BSC 103 and LE 101 are treated as one logical entity, however it should be understood that the BS 104 and BSC 103 terminate air interface protocols and, for the purposes of this discussion, are transparent to the audio signals that flow through them to be terminated at the LE 101. The BSC 103 may also pass certain signaling indications to the LE 101 on behalf of the FSU 107, for example: switch-hook state.

The sequence begins when the subscriber telephone goes off-hook to request a new call origination. Preferably, as fast as it can respond, the FSU 107 begins the process of requesting a connection which includes getting the BS 104 and BSC 103 to allocate a wireless interface traffic channel and getting the BSC 103 to request a network dial tone from the LE 101. Virtually simultaneously, the FSU 107 provides internally generated dial tone to the subscriber telephone 108 and the subscriber begins to dial by inpulsing DTMF tones to the FSU 107. These inpulsed digits are detected and stored within the FSU 107. Importantly, the user has received a dial tone at this point.

Eventually, after possibly several seconds, the wireless traffic channel is allocated and the BSC 103 detects and indicates to the FSU 107 that LE 101 dial tone is available. With these two enabling events in place, the FSU 107 begins the process of outpulsing the stored digits. The outpulsing process is rapid with each digit lasting for about 100 ms followed by an inter-digital time of 100 ms. Other embodiments of the invention use different time periods. What is important is that the FSU 107 can often outpulse the stored digits faster than a user would typically be entering digits. No other pauses are necessary. It is possible and permitted for the subscriber telephone to continue to impulse additional digits during the FSU 107 outpulsing operation. The new digits are stored, queued and outpulsed in sequence with the previously stored digits. So far the audio path is not cut-through from the subscriber telephone 108 to the LE 101, so these additional inpulsed digits are only directly "heard" by the FSU 107.

If the subscriber inpulsing rate is slower than the FSU outpulsing rate (as is likely to be the case for a human dialer) the queue of stored digits will become exhausted. That is, there are no more stored digits to be outpulsed. Immediately or soon thereafter, upon this occurrence, the FSU 107 cuts-through the audio path between the subscriber telephone and the BS 104, BSC 103 and LE 101. Following cut-through, any LE 101 provided call progress tones can be heard by the subscriber. Furthermore the LE 101 can also receive any additional digits directly from the subscriber. No more FSU 107 involvement in the dialing process is necessary. If the called party answers speaking may begin without delay.

In this scenario, the subscriber has had the dual benefit of rapid onset of dial tone following off-hook and rapid cut-through to the LE 101 for the purpose of receiving call progress tones and speaking to the called party.

Subscriber Fails to Dial After Transition to Off-Hook

Figure 4:
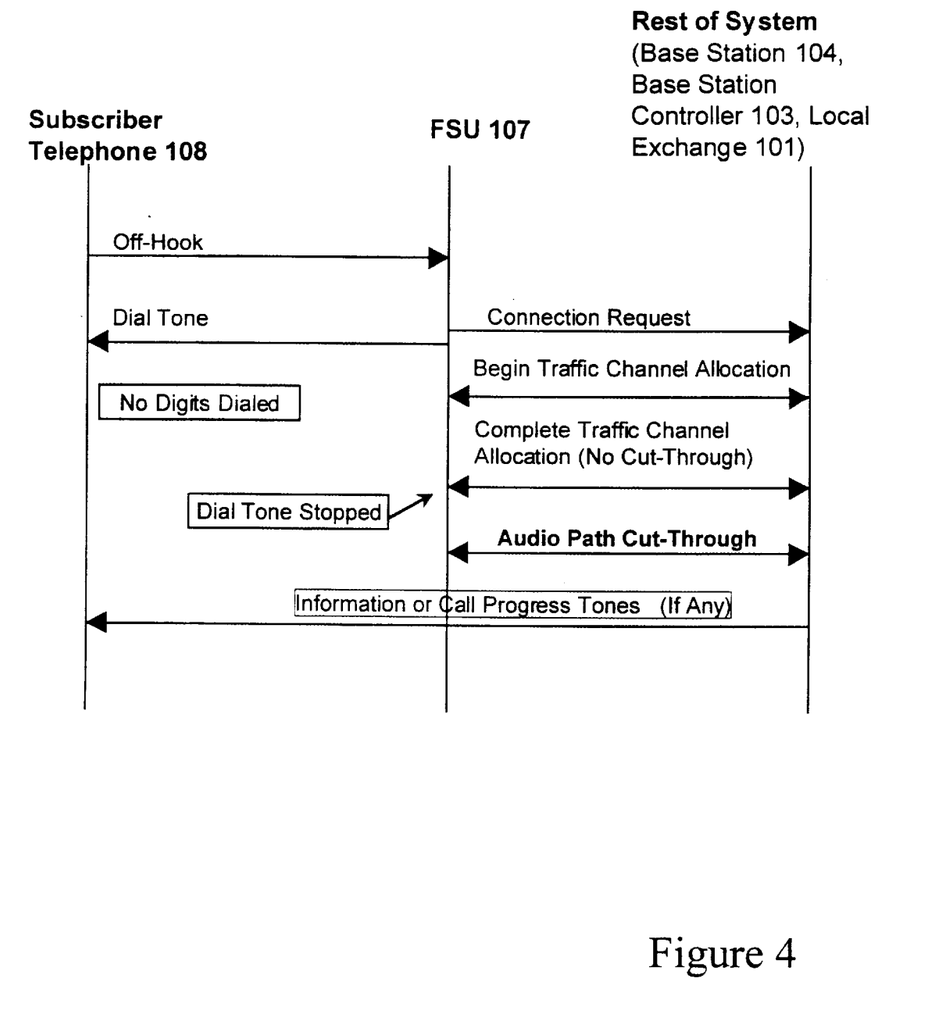
FIG. 4 illustrates a message and event flow for the case where the subscriber telephone transitions from the idle state to the off-hook state as if requesting a new call origination.

FIG. 4 shows message and event flow for the case where the subscriber telephone transitions from the idle state to the off-hook state as if requesting a new call origination. However, in this scenario, the subscriber fails to dial. This scenario could, for example, apply to an accidental off-hook caused by a housecat or child. The FSU 107 behaves like in FIG. 3, but since no digits are dialed, cut-through occurs as soon as the traffic channel is allocated. This allows network information tones, recorded voice alerts and/or howler tone to be received by the subscriber, possibly alerting him to hang-up the phone. Of course if the cutthrough occurs while the LE 101 is still providing dial tone, then the subscriber will hear dial tone from the LE 101 after cut-through occurs.

Subscriber Fails to Dial After Transition To Off-Hook Cut-Through Governed by Timer T1

Figure 5:
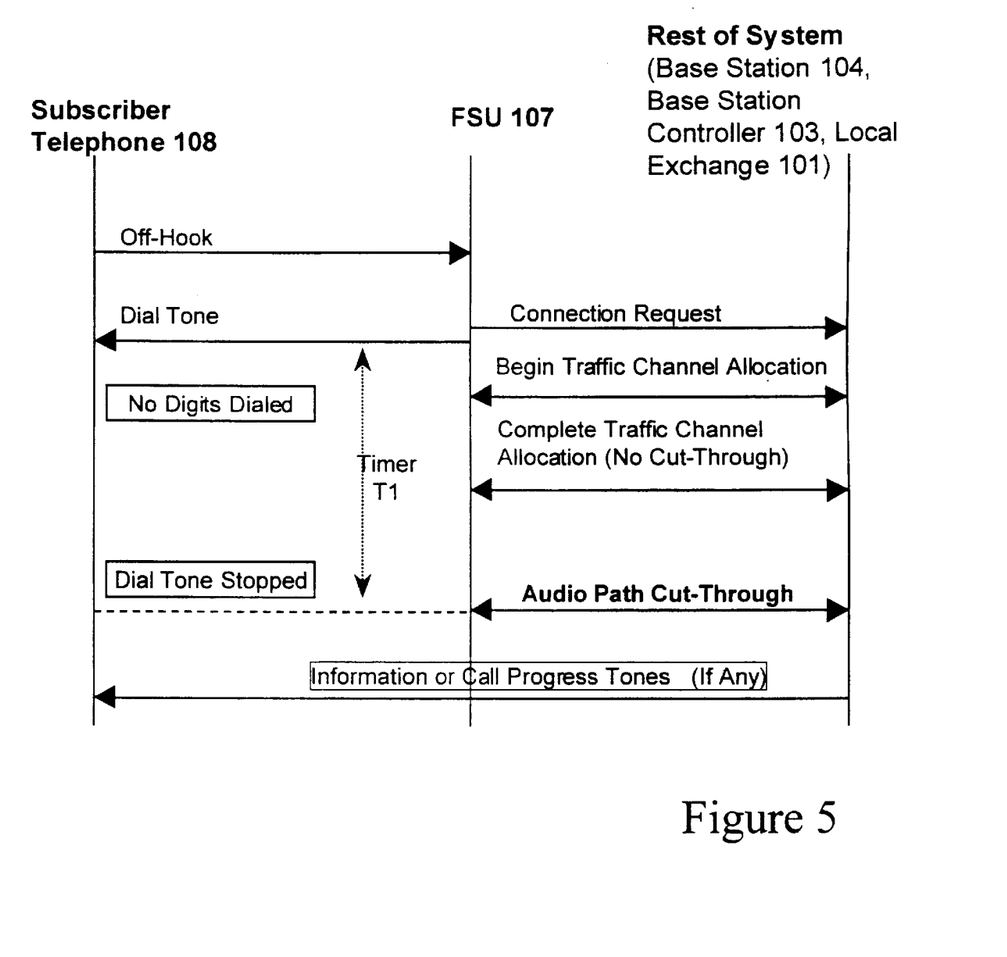
FIG. 5 illustrates a scenario similar to that of FIG. 4, except that dial tone stopping and cut-through occur after the expiry of a timer.

Referring to FIG. 5, this scenario is similar to that of FIG. 4, except that dial tone stopping and cut-through occur after the expiry of a timer T1 which is set to be longer than the expected traffic channel allocation time. The timer T1 is used, therefore, to make the duration of local dial tone longer. This has an advantage when the audio characteristics of the dial tone generated in the FSU 107 differ from the characteristics of the dial tone generated in the LE 101. In the scenario of FIG. 4, the subscriber may hear the transition between local dial tone and LE 101 dial tone at the time of cut-through under the assumption that cut-through occurs while the LE 101 is still providing dial tone. Since each LE 101 may be configured with a deterministic dial tone timeout characteristic T1, the FSU 107 dial tone timer can be set to just match this LE 101 dial tone timeout value. In that case local dial tone will be removed, if no digits are dialed, just at the time that the LE 101 also removes its dial tone and the subscriber will not hear an FSU 107 dial tone to LE 101 dial tone discontinuity. If T1 is set to zero, then this scenario is identical to that of FIG. 4.

Timer T1 can be administerable at install-time. Its value can be stored in FSU 107's non-volatile memory and may be altered through a variety of means including local programming jig, wireless interface based commands, dip switch settings or other equivalent methods.

Alternatively, the FSU 107 can listen for a change in the LE 101's dial tone and cut through after the change. This is similar to the timer scenario except now the FSU 107 is listening for the LE 101's dial tone. When the dial tone stops (because the connection is being made, the howler is being generated, etc.) the FSU 107 will cut through.

Private Line Automatic Ring-Back Operation

Figure 6:
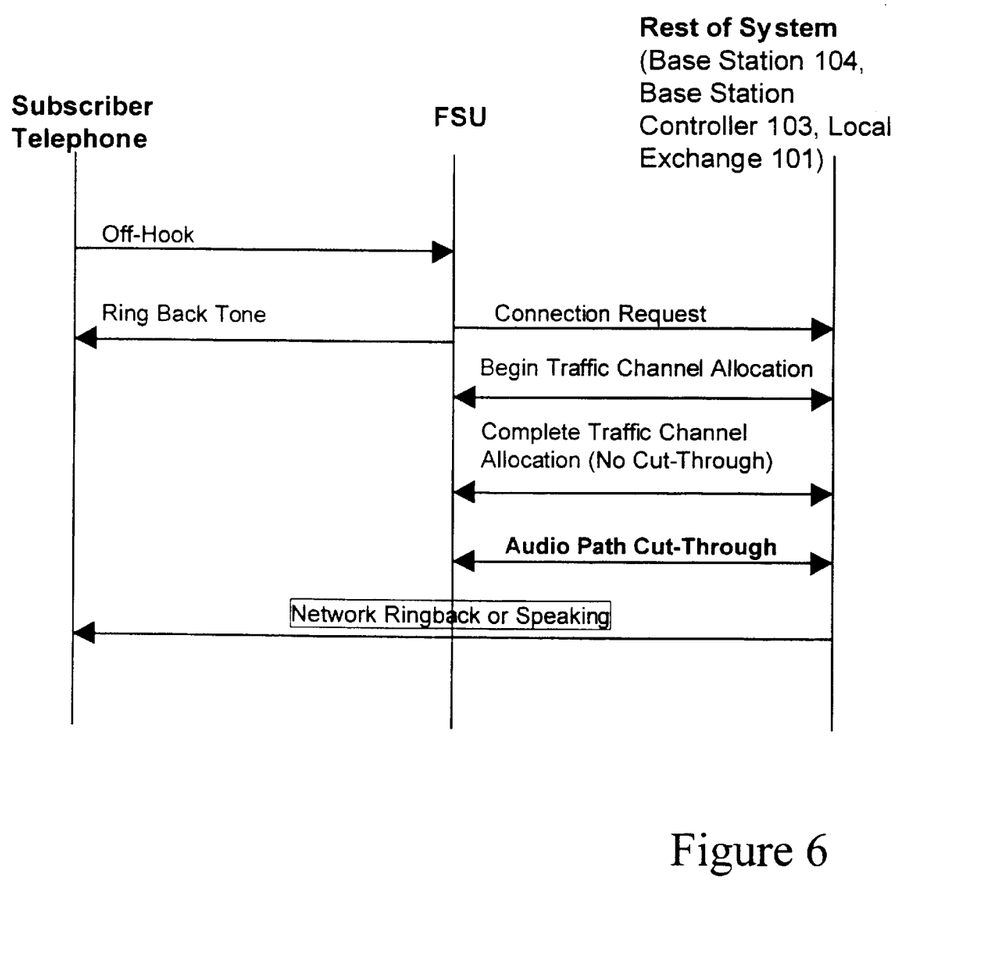
FIG. 6 illustrates a scenario is similar to that of FIG. 4 except that a ring-back tone is provided.

Referring to FIG. 6, this scenario is similar to that of FIG. 4 except that the FSU 107 provides ring-back tone instead of dial tone. This operation can be used with private line automatic ring-back ("PLAR") operation. PLAR service is provided by the LE 101, or equivalent transmission terminal, to support a "hot-line" type of operation. PLAR connected telephones are not equipped for dialing at all. When a PLAR telephone goes off-hook an automatic connection is established by the LE 101 to a pre-designated destination telephone (e.g., elevators are often equipped with these types of phones). The subscriber expects to hear immediate ring-back tone without dialing and the destination telephone receives ringing voltage. When the destination phone goes off-hook in response to this ringing the connection is automatically established between the subscriber and the destination phone.

In this scenario, the FSU 107 provides immediate ring-back tone and, when the traffic channel is allocated, cut-through occurs to allow the subscriber to hear network ring-back tone or to assume the speaking state of the call.

Automatic De-Allocation of Traffic Channel on Expiry of Timer T2

Figure 7:
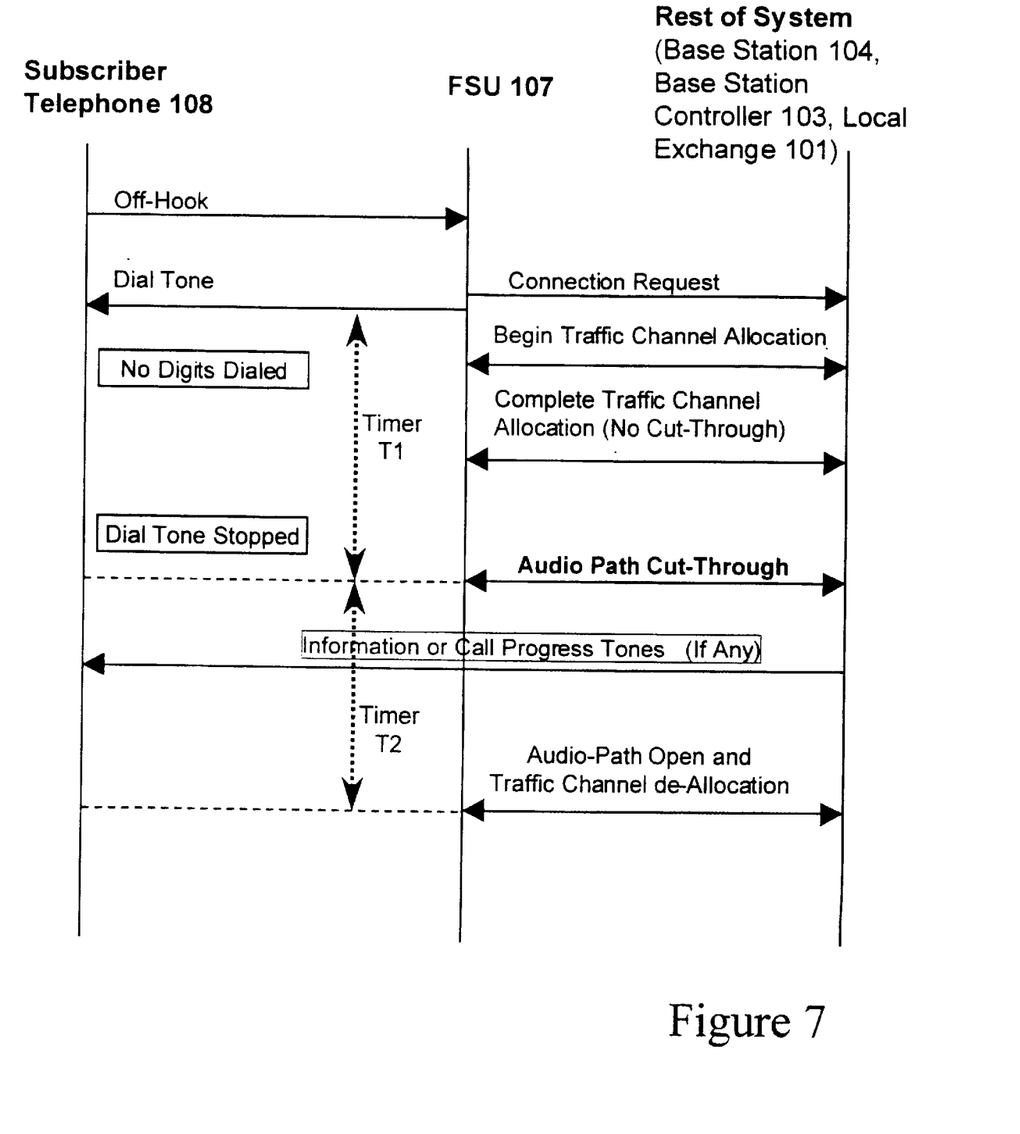
FIG. 7 illustrates a scenario that is an extension of in FIG. 4 and FIG. 5 in which no digits have been dialed.

Referring to FIG. 7, this scenario is an extension of in FIG. 4 and FIG. 5 in which the FSU 107 recognizes that since no digits have been dialed, the subscriber telephone must be off-hook in error. The FSU 107 seeks to release the shared and scarce wireless traffic channel after allowing a period of time following cut-through in which net information tones and messages including howler tone may be heard by the subscriber. The traffic channel cut-off time is governed by Timer T2 which should be administerable at install time. T2 should be set equal to the period of time that the LE 101 provides howler or similar alerting tones or messages. It's value can be stored in FSU 107 non-volatile memory and may be altered through a variety of means including local programming jig, wireless interface based commands, dip switch settings or other equivalent methods.

In some embodiments, the FSU 107 can sample, or can have a sample of, the howler tone to provide this tone to the subscriber unit.

Flash and Re-answer Sequences

Figure 8:
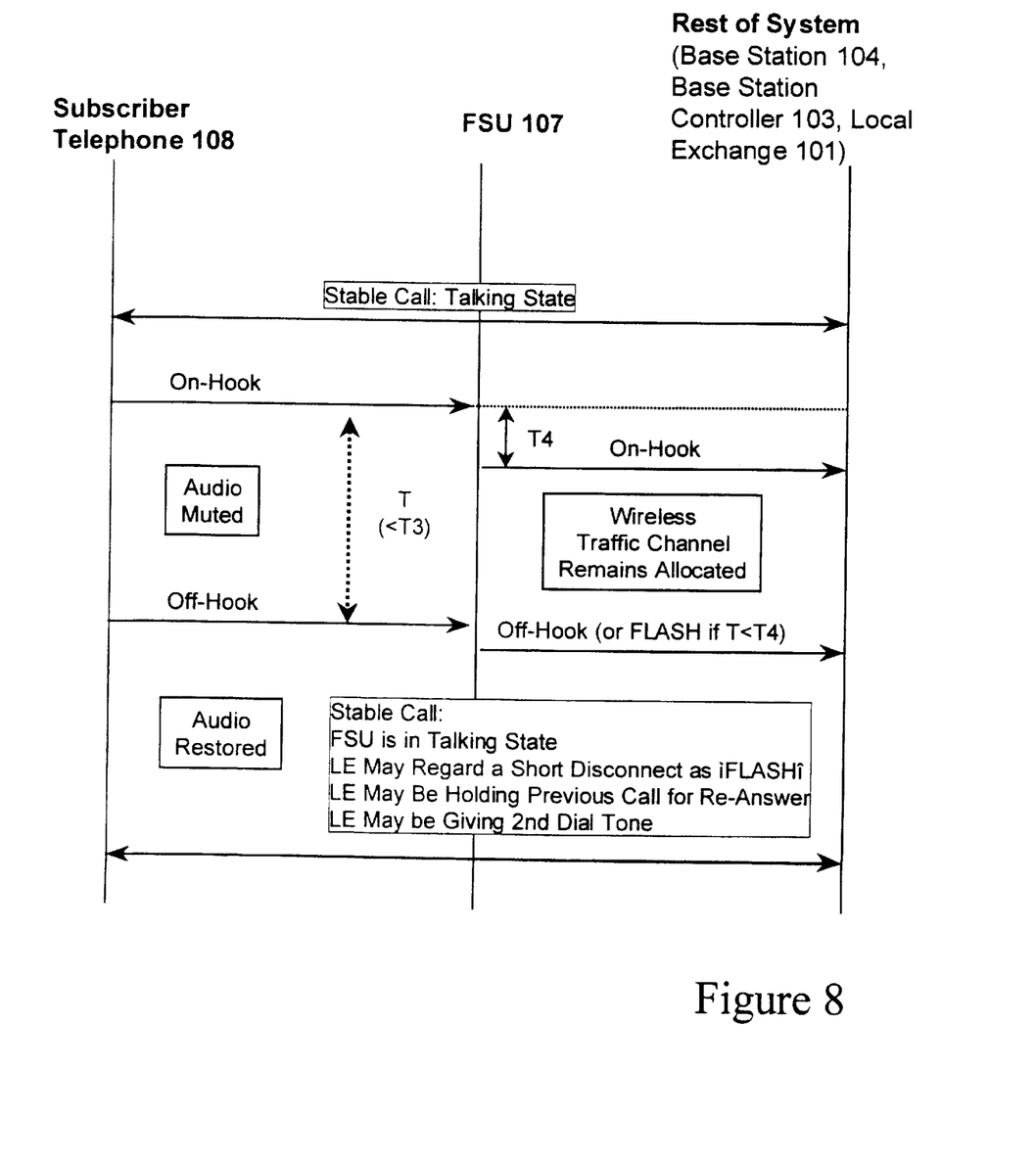
FIG. 8 illustrates a scenario in which a stable call is in place when an on-hook condition occurs.

Referring to FIG. 8, in this scenario, a stable call is in place when an on-hook condition occurs at the subscriber telephone lasting for a time T less than some value, T3, followed by a return to off-hook condition. Because the on-hook persists for less than the threshold value T3 the FSU 107 only relays the on-hook condition (or FLASH Message—see below) to the LE 101 via the BS 104 and BSC 103, but does not tear down the wireless traffic channel. The FSU 107 audio channel is muted to avoid annoying clicks or oscillatory audio conditions. On resumption of the off-hook condition, the FSU 107 treats the call as a simple continuation of the original call and cuts-through without delay and without providing dial tone or accepting inpulsed digits.

Exactly how the LE 101 interprets the on-hook condition depends on how the LE 101 is configured, the duration of the on-hook condition, and whether the stable call was originally an incoming or outgoing call to/from the FSU 107.

FLASH—Many LEs 101 can be configured to regard a brief (typically <1 sec) on-hook state as a request to activate a feature like Hold, Conference, Transfer etc. In FIG. 8, if the on-hook time is less than FLASH timer T4, then a FLASH signaling sequence is sent to the LE 101. The flash timing to the LE 101 must fall within tight limits and the signaling latency between FSU 107 and BSC 103 may be too variable to provide accurate reflection of the subscriber's on-hook interval at the interface to the LE 101. Therefore, the FSU 107 recognizes a FLASH event, and differentiates it from a simple on-hook. At the BSC 103 the flash pulse to the LE 101 may be of fixed and predetermined length greater than or equal to the actual telephone on-hook time. T4 is the maximum time the user can go on-hook and have the FSU 107 treat as a flash. T4 may be set to zero if the FLASH feature is not supported by the LE 101.

Re-Answer—Many LEs 101 can be configured to support the Re-Answer feature which allows a called party in a stable call to go on-hook for a time and then, provided that the calling party has not abandoned the call, the called party may re-answer the call by returning off-hook. A calling party may not have this privilege. The FSU 107 in FIG. 8 can support this feature. T3 has two values: one for incoming calls and one for outgoing calls so the FSU 107 remembers the history of how the current stable call was established.

For incoming calls, T3 is set to be equal to or less than the LE 101 allowed re-answer time. T3 is also greater than T4, the FLASH timer. For outgoing calls, or in cases where reanswer is not supported by the LE, T3 may be made to be just greater than T4. Following the subscriber telephone's on-hook transition, on the expiry of T4, an on-hook indication is made to the LE 101. The wireless traffic channels are kept allocated to the call. If the LE 101 is configured to support re-answer and the calling party remains active then the on-hook indication does not cause it to immediately tear down the call in progress. Later when the subscriber returns off-hook within the T3 limit, the off-hook indication is sent to the LE 101 and the call resumes.

If the calling party abandons the call during the on-hook period, then the LE 101 will tear down its connection. In this case, when the subscriber telephone returns off-hook and the off-hook indication is sent to the LE 101, it will immediately provide dial tone which will be cut-through without delay to the FSU 107 and subscriber. The subscriber can then decide to dial (in cut-through mode) or hang-up.

Timers T3 and T4 can be administerable at install-time. Their values can be stored in FSU 107 non-volatile memory and may be altered through a variety of means including local programming jig, wireless interface based commands, dip switch settings or other equivalent methods.

Disconnect and Re-Originate

Figure 9:
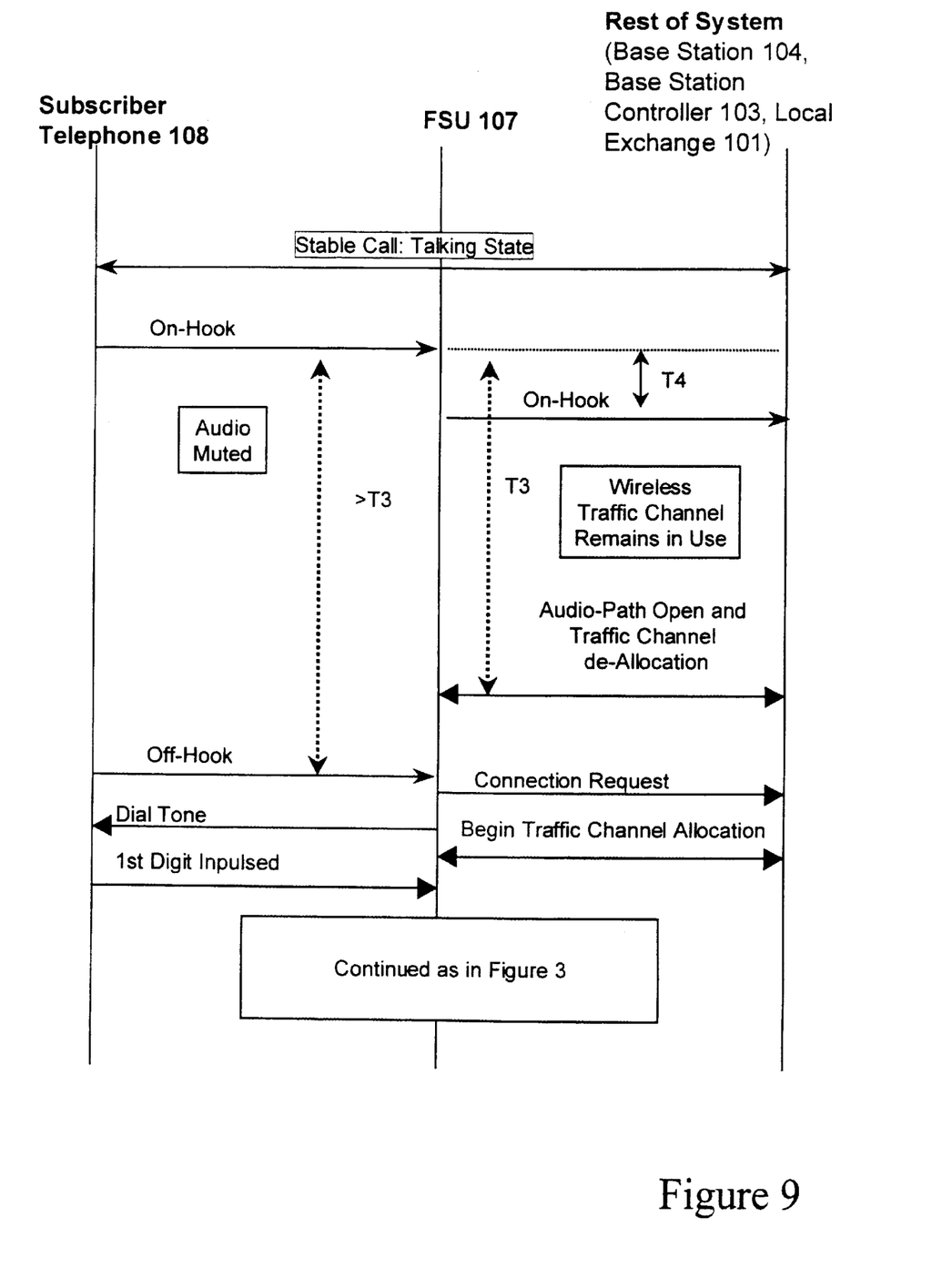
FIG. 9 illustrates a second scenario in which a stable call is in place when an on-hook condition occurs.

Referring to FIG. 9, in this scenario, the subscriber goes on-hook for a period greater than T3. At the expiry of T4 the FSU 107 gives an on-hook indication to the LE 101. At the expiry of T3 the FSU 107 de-allocated the wireless traffic channel and returns to the idle state. A new off-hook transition by the subscriber will receive the same treatment as a new call as described in the scenario of FIG. 3.

Alternative Embodiments

Various embodiments of the invention can be used in other systems where there may be a significant delay in receiving a dial tone from a PSTN or local exchange. For example, voice over IP systems may incur a significant delay in creating a communications channel. In such systems, a computer or telephone could provide a local dial tone function until the communications channel with a local exchange or PBX is established.

In the embodiments described herein, the subscriber telephones are connected to the FSU 107 via wired metallic lines. However, other embodiments of the invention may use wired (telephone, computer network, and/or cable system wire), fiber, and/or wireless (e.g. 900 MHz) media to communicate with the fixed subscriber unit.

Conclusion

The foregoing description of various embodiments of the invention have been presented for purposes of illustration and description. It is not intended to limit the invention to the precise forms disclosed. Many modifications and equivalent arrangements will be apparent.

What is claimed is:

1. A method for using a fixed subscriber unit in a wireless local loop system, the wireless local loop system including a subscriber telephone, the wireless local loop system being coupled to a local exchange, the method comprising:

receiving a new call origination signal from the subscriber telephone;

receiving and storing a string of digits from the subscriber telephone;

outpulsing the string of digits after a wireless traffic channel is established, while continuing to accept additional digits; and providing audio cut-through transmission between the subscriber telephone and the local exchange after the outpulsing of the stored string of digits.

2. The method of claim 1 further comprising blocking transmission between the subscriber telephone and the local exchange prior to providing the audio cut-through.

3. The method of claim 1 further providing a local dial tone signal to the subscriber telephone in response to the new call origination signal.

4. The method of claim 1 wherein outpulsing the string of digits is done in approximately 100 ms intervals between each digit in the string of digits.

5. The method of claim 1 wherein after the audio cut-through, any remaining digits are passed through the audio channel between the local exchange and the subscriber telephone.

6. The method of claim 1 further comprising waiting for a predetermined time before allowing the audio cut-through, the predetermined time corresponding to the length of time of a dial tone timeout of the local exchange.

7. The method of claim 1 wherein the audio cut-through is not provided until the additional digits are pulsed.

8. The method of claim 1 further comprising requesting an establishment of a wireless traffic channel according to the Personal Handy-phone Service ("PHS") air interface governed by Association of Radio Industries and Businesses (Japan) ARIB RCR STD-28 wireless interface standard.

9. A method for using a fixed subscriber unit in a wireless local loop system, the wireless local loop system including a subscriber telephone, the wireless local loop system being coupled to a local exchange, the method comprising:

requesting a wireless channel in response to a subscriber new call origination signal;

providing local dial tone functions to the subscriber telephone; and if no digit signals at all are received-for a predetermined period of time, ceasing to provide the local dial tone functions and providing audio cut through to the wireless channel.

10. The method of claim 9 wherein the dial tone functions includes generating an immediate dial tone.

11. The method of claim 9 further comprising receiving a signal to set a value for the predetermined period of time.

12. The method of claim 9 further comprising releasing the wireless channel after a second predetermined period of time in which no digit signals are received.

13. The method of claim 12 further comprising receiving a second signal to set a value for the second predetermined period of time.

14. A computer program product comprising:

a computer usable medium having a computer readable program code embodied therein for causing a computer to provide a dial tone while a communications channel is being established and for providing audio cut-through to the communications channel when the communications channel is established, the computer program comprising:

a set of instructions for causing the dial tone to be generated in response to receiving a call origination signal;

a set of instructions for receiving and storing a sequence of digits;

a set of instructions for initiation of the establishment of the communications channel in response to the call origination signal;

a set of instructions to cause the stored sequence of digits to be pulsed in response to the establishment of the communications channel while continuing to receive and store additional digits; and a set of instructions to cut-through an audio signal to the communications channel when the communications channel is established after the pulsing of the stored digits.

15. The computer program product of claim 14 wherein the set of instructions to cut-through the audio signal includes instructions for delaying the cut through for a predetermined time, the predetermined time corresponding to the dial tone timeout for a local exchange.

16. The computer program product of claim 14 wherein the computer program includes a set of instructions to block the audio signal from cutting through to the communications channel until all the stored digits are pulsed.

17. The computer program product of claim 14 wherein the communications channel includes a wireless local loop communications channel.

18. The computer program product of claim 14 wherein the communications channel includes a voice over IP communications channel.

19. A method of using a fixed subscriber unit in a wireless local loop system, the method comprising:

establishing a telephone call over a wireless channel;

receiving an off-hook to on-hook transition signal during the telephone call, wherein the on-hook state is maintained for a first period, wherein the first period is less than a predetermined period; and if the first period is greater than a first predetermined period and less than a second predetermined period, generating an off-hook to on-hook transition signal to be communicated on the wireless channel and maintaining the wireless channel for at least the first period; and wherein the fixed subscriber unit does not provide a local dial tone during the first period.

20. The method of claim 19 wherein the fixed subscriber unit does not buffer digit signals during the first period.

21. The method of claim 19 wherein the first period depends upon whether the telephone call is an incoming or outgoing call.

22. The method of claim 19 further comprising receiving a call origination signal, buffering digit signals until a wireless communications channel is established, and pulsing at least the buffered digital signals prior to providing an audio cut-through to the wireless communications channel.

23. The method of claim 19 wherein the first period is determined from a programmable value.

24. A wireless local loop system comprising:

a subscriber telephone;

a based station coupled to the fixed subscriber unit via a plurality of wireless communications channels; and a fixed subscriber unit coupled to the subscriber telephone, the fixed subscriber unit providing a local dial tone to the subscriber telephone, the fixed subscriber unit having a memory to store digit signals from the subscriber telephone while a communications channel is being established with the base station, a pulser circuit to pulse the stored digit signals when a communications channel is established, and a cut through circuit to connect the audio information from the base station communications channel to the subscriber telephone after pulsing of the stored digit signals.

25. A fixed subscriber unit for use in a wireless local loop system comprising:

means for receiving a new call origination signal;

means for receiving and storing a string of digits corresponding to a portion of a telephone number;

means for outpulsing the string of digits after a wireless traffic channel is established, while continuing to accept additional digits; and means for providing audio cut-through transmission to the wireless traffic channel after the outpulsing of the stored string of digits.

26. A method of using a fixed subscriber unit in a wireless local loop system, the method comprising:

establishing a telephone call over a wireless channel;

receiving an off-hook to on-hook transition signal during the telephone call, wherein the on-hook state is maintained for a first period before receiving an on-hook to off-hook transition signal;

if the first period is greater than a first predetermined period and less than a second predetermined period, generating an off-hook to on-hook transition signal to be communicated on the wireless channel and maintaining the wireless channel for at least the first period; and if the first period is less than the first predetermined period, generating a flash signal and maintaining the wireless channel.

\* \* \* \* \*